US011494566B2

(12) United States Patent
Shah et al.

(10) Patent No.: US 11,494,566 B2
(45) Date of Patent: Nov. 8, 2022

(54) SYSTEMS AND METHODS FOR ADAPTIVE EMOTION BASED AUTOMATED EMAILS AND/OR CHAT REPLIES

(71) Applicant: Avaya Management L.P., Santa Clara, CA (US)

(72) Inventors: Shamik Shah, Pune (IN); Asmita Gokhale, Pune (IN); Valentine C. Matula, Granville, OH (US)

(73) Assignee: Avaya Management L.P., Santa Clara, CA (US)

( * ) Notice: Subject to any disclaimer, the term of this patent is extended or adjusted under 35 U.S.C. 154(b) by 174 days.

(21) Appl. No.: 16/860,323

(22) Filed: Apr. 28, 2020

(65) Prior Publication Data
US 2021/0334472 A1    Oct. 28, 2021

(51) Int. Cl.
| | |
|---|---|
| *G06F 17/00* | (2019.01) |
| *G06F 40/35* | (2020.01) |
| *G06N 20/00* | (2019.01) |
| *H04L 51/02* | (2022.01) |
| *G06Q 30/00* | (2012.01) |
| *G06Q 10/10* | (2012.01) |
| *G06N 5/04* | (2006.01) |

(52) U.S. Cl.
CPC .............. *G06F 40/35* (2020.01); *G06N 5/04* (2013.01); *G06N 20/00* (2019.01); *G06Q 10/107* (2013.01); *G06Q 30/016* (2013.01); *H04L 51/02* (2013.01)

(58) Field of Classification Search
CPC .... G06Q 30/016; G06Q 10/107; H04L 51/02; H04L 51/20; G06F 40/35; G06F 40/30; G06N 20/00; G06N 5/04; G10L 25/48; H04M 3/5175

USPC ............................................................ 704/9
See application file for complete search history.

(56) References Cited

U.S. PATENT DOCUMENTS

| | | | | |
|---|---|---|---|---|
| 7,346,492 | B2 * | 3/2008 | Shaw | ...................... G10L 15/08 704/255 |
| 8,634,543 | B2 | 1/2014 | Flockhart et al. | |
| 10,171,659 | B2 | 1/2019 | Riahi et al. | |
| 11,289,082 | B1 | 3/2022 | Lacy et al. | |
| 2004/0225640 | A1 * | 11/2004 | Brown | ................. G06Q 10/107 |
| 2010/0235218 | A1 | 9/2010 | Erhart et al. | |
| 2010/0296417 | A1 | 11/2010 | Steiner | |

(Continued)

OTHER PUBLICATIONS

Official Action for India Patent Application No. 202114018404, dated Feb. 25, 2022 6 pages.

*Primary Examiner* — Md S Elahee
(74) *Attorney, Agent, or Firm* — Sheridan Ross P.C.

(57) ABSTRACT

Efficient and effective communications with customers is a cornerstone of many businesses. Automation, such as in the form of automated agents that can engage in a communication with a customer, furthers those efficient and effective communications. However, textual messages are a series of messages that are often limited to factual statements and direct questions, leaving many customers, such as those that prefer or require high-context communications, may have the impression that the organization with which they are communicating is cold and uncaring or unconcerned about them. By selectively altering the series of messages, an appropriate degree of concern or empathy may be conveyed to facilitate a better relationship and more effective and efficient communications.

20 Claims, 9 Drawing Sheets

(56) References Cited

U.S. PATENT DOCUMENTS

| | | |
|---|---|---|
| 2011/0125793 A1 | 5/2011 | Erhart et al. |
| 2011/0125826 A1 | 5/2011 | Erhart et al. |
| 2014/0140497 A1* | 5/2014 | Ripa ................. H04M 3/5175 |
| | | 379/265.06 |
| 2019/0122092 A1 | 4/2019 | Haines et al. |
| 2021/0158805 A1 | 5/2021 | Sivasubramanian et al. |
| 2021/0158813 A1 | 5/2021 | Sivasubramanian et al. |

* cited by examiner

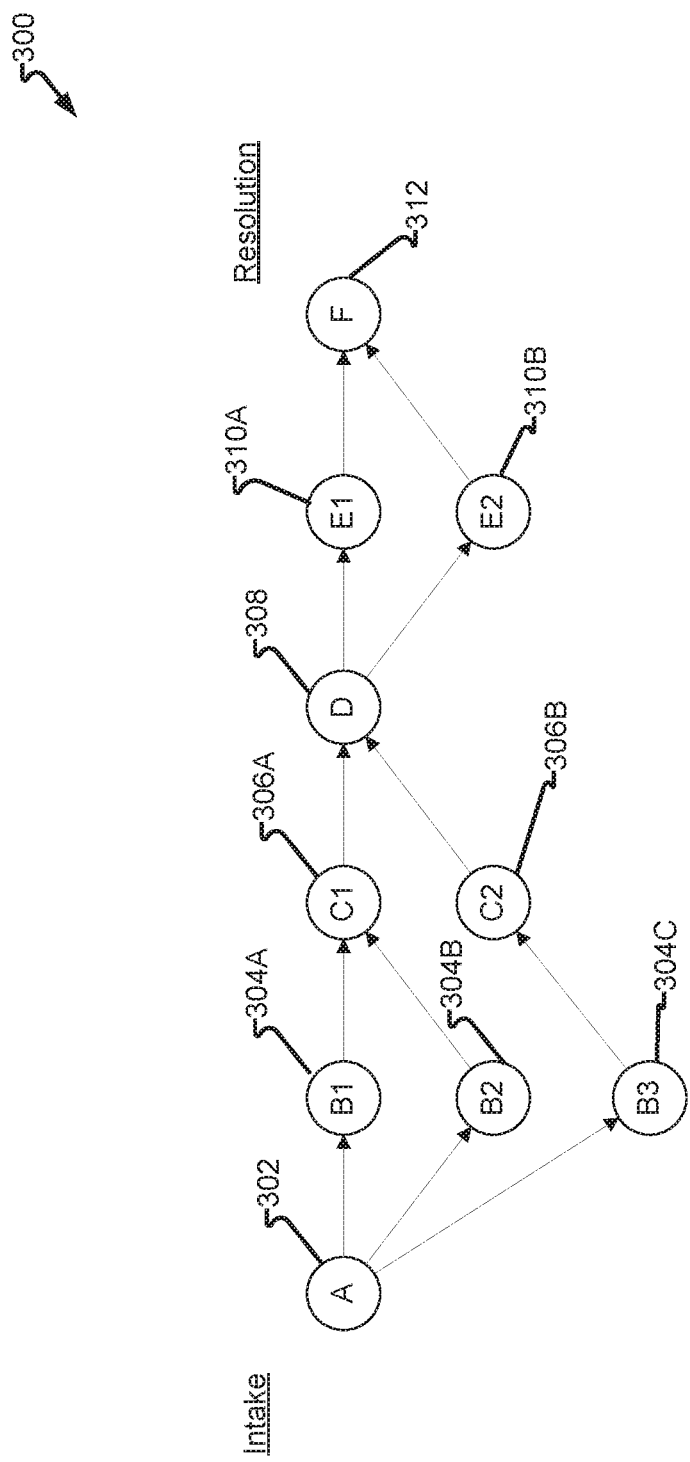

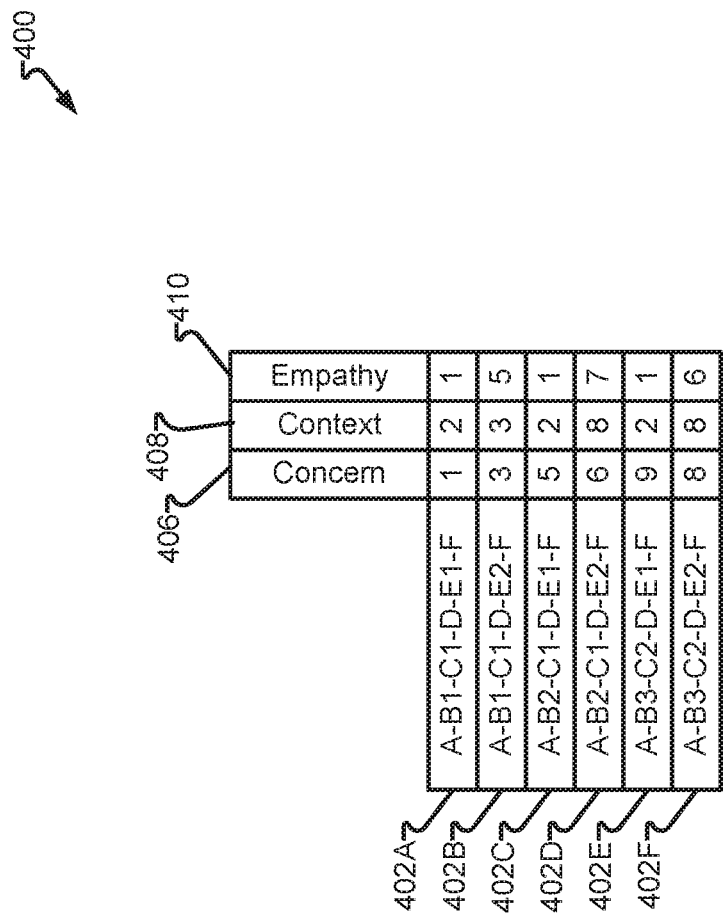

| | | Concern | Context | Empathy | Cust. Attrib. |
|---|---|---|---|---|---|
| Unable to Connect to the Internet | Is the router's power light on? | 0 | 0 | 0 | 3 |
| | Let's make sure the router is still operational. Are there any lights lit on the router? | 6 | 5 | 2 | 1 |
| Router powered? | Let's see if we can get you up and running. First, let's eliminate the easy stuff. Does your router have any lights on? | 6 | 5 | 8 | 2 |
| | Please verify the router power light is on. | 0 | 2 | 0 | 2 |
| | What color is the light by the word "Connection?" | 0 | 0 | 0 | 0 |
| | Please tell me the light by the word "Connection" isn't red. | 9 | 2 | 2 | 1 |
| Router connected | The router itself looks to be working properly. That's good. What about the light next to the word "Connection," what color is that? | 8 | 4 | 4 | 3 |

Category Attributes 600

| | | | | | |
|---|---|---|---|---|---|
| 610 → Empathy | 1 | 4 | 6 | 3 |
| 608 → Context | 2 | 8 | 3 | 2 |
| 604 → Concern | 1 | 5 | 8 | 2 |
| | Culture 1 | Culture 2 | Culture 3 | Culture 4 |

Individual Attributes 700

| | | | | |
|---|---|---|---|---|
| 712 → Culture | 2 | 4 | 3 | 3 |
| 710 → Empathy | - | 1 | 6 | 3 |
| 708 → Context | - | 2 | 8 | 5 |
| 704 → Concern | - | 1 | 8 | 4 |
| | Customer 1 | Customer 2 | Customer 3 | Customer 4 |

702A, 702B, 702C, 702D

SYSTEMS AND METHODS FOR ADAPTIVE EMOTION BASED AUTOMATED EMAILS AND/OR CHAT REPLIES

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for message insertion and directing and particularly to presenting single node signals to direct a dual-node communication.

BACKGROUND

In a contact center, serving outbound, inbound and chat and email operations, handling customers efficiently is of prime importance. Agents are trained in real time to answer the customers in best possible manner. This real time training to the agents include agent scripting and prompting to ask better questions, seek information from the customer based on their conversation, provide better options, suggestions, and/or solutions so to the customer for their described problem. It is often preferable to utilize automated agents when possible.

SUMMARY

In any industry, handling customers through automated emails, chat operations are of prime importance. In a multichannel (e.g., voice, chat/messaging, emails, video, etc.) contact center voice communications, as well as short message service (SMS), text, chat, social media post/reply, email, and other text-based communications are similarly of key importance to address customer issues, receive and process customer requests, and other communications. Customers are often connected to an automated resource to provide automated emails, SMS/text, and/or live chat via chatbots are used to respond to customers efficiently to answer questions, seek information, provide options or suggestions, or otherwise address an issue for customers.

A problem with many automated SMS, email, and chatbot replies or other statements/question asked by of chatbots, is that they do not include "human touch," for example emotions, with which a particular situation with a customer is required to be handled properly. Due to the lack of emotions, automated messages handle the customer, even different types of customer, in the same way. The absence of an appropriate emotional tone may lead to customer dissatisfaction or resentment.

As an example, a frustrated customer is complaining about the service disruptions or poor product quality during a live chat or via email. The usual chatbot or email replies would provide emotionless answers and suggested courses of action but would not sufficiently handle the customer who may have a need to know that their concerns, and their business, are important and/or the source of their frustration sufficiently appreciated. A factual, emotionless response may increase the customer's frustration as the customer is left to the mercy of emotionless automated replies.

In a different scenario, consider a marketing or sales campaign to be carried across different regions of the world. Asian, African, Arab, central European and Latin American cultures are generally considered to be high-context cultures, that is they rely on implicit communication and nonverbal cues. Whereas cultures with western European roots, such as the United States and Australia, are generally considered to be low-context cultures which relies on explicit communication. If the same, preconfigured automated replies or chat replies are used to campaign or respond across the world it would not be well received and the communications wasted, which may require a follow-up or other communication.

These and other needs are addressed by the various embodiments and configurations of the present invention. The present invention can provide a number of advantages depending on the particular configuration. These and other advantages will be apparent from the disclosure of the invention(s) contained herein.

In one embodiment, systems and methods are provided for advanced emotion based automated emails and/or chat replies, effective handling of the customers within the contact center with delivery of personalized responses thereby achieving higher customer satisfaction in less time.

In another embodiment, the appropriate emotion is automatically determined, selected, and applied to a text component provided by an automated response to appropriately handle a particular type of customer based on several different factors and changing the email or chat responses in real time.

In another embodiment, the determination of the emotion to apply may be based on one or more of:

1. Customer information, personality type of the customer
2. Real time analysis of the context of the conversation
3. Text analysis of emails or chats to understand the emotion of the customer e.g. angry, happy, dissatisfied, frustrated, depressed, etc.
4. Past history of type of interaction with the customer e.g. successful, unsuccessful, satisfied, dissatisfied, etc.
5. Past history of problem/issue/requirement of the customer.
6. Current ongoing latest, highest and average issues/requirements in the contact center overall and their resolutions
7. Dictionary of words
8. Geographic region customer belongs to
9. Culture and religion of the customer
10. Origin and current location of the customer
11. Demographic details of the customer
12. Kind of problem mapped to the personality type of the customer and its demographics.

The foregoing list of factors is not exclusive and other factors to the emotion determination process may also be considered.

For example, emails or chat responses can be altered considering the culture of a particular customer. If a customer belongs to, for example, an Asian culture which is considered to be high-context culture email or chat replies can be changed to use high-context language in the responses. In high-context cultures such as this, a message is more difficult to understand without a background information, which may be significant. For example, the background may include detailed greetings, talks about past conversations, etc. However, communications with customers that belong to a low-context culture, such as those with western European roots, are more likely to be successful if direct, to-the-point, responses are used in email or chat responses.

Understanding the severity of the issue can be of high importance. However different customers may perceive different issues with different severity. As a yet another example, service disruptions are considered to be critical issues for businesses but not for households. Therefore the responses from email or chatbots may be tweaked accordingly for the kind of issue mapped to the kind of customer in addition or alternative to the factors disclosed herein.

In another embodiment, some or all of the above factors may be input into a machine learning algorithms seeded to produce an accurate, and continually improving, outcome describing the "how" a particular type of sentence should be delivered for a particular type of customer given the context at hand.

In another embodiment, a configurable indicia, which may include color, font, metadata, etc., may be applied to highlight the sentences where-in a particular indicia would emphasize a specific emotion while delivering that sentence. Individual words can also be highlighted or emphasized differently describing the amount of emphasis required on that word. While choosing the colors geographic aspects can also be considered and accordingly email or chat responses can be modified. For example, red color is considered sign of risk in most of the countries but in countries like for example China red is considered as symbol of luck, prosperity, happiness.

These methods will also help in impersonating the automated emails or chat responses as to be originating from a human and not machine, which will further raise the satisfaction level of the customer that they are being provided personal attention.

In another embodiment, choosing the correct word, from a pool of equivalent individual words or phrases, is made based on the determined context at hand as well as the customer's personality and emotions. For example, when the customer's sentiments are negative the selection of words to be replied may be selected to be more submissive and affirmative.

Implementation of the embodiments herein promote the acceptability rate of the responses delivered to the customer. The right choice of sentences, with emphasis on the impactful words with proper reflective emotions would make the conversation more satisfactory and efficient. As the acceptability rate increases, time required to close down on a conversation reduces leading to high customer satisfaction.

Embodiments disclosed herein emphasize the modification of automated email, chat, or other text messages provided by automated agents to adapt to the customer being handled and the context of the conversation. Different personality type of customers with same or different emotions, from same or different origins, cultures and religions, with same or different problem/requirement at hand, will receive personalized, effective and efficient responses as we are mining the customer's emotions, conversation context, demographic details, countries and cultures and adapting to it. Therefore, the current embodiments help to achieve higher customer satisfaction in less time, more effectively, and this is helpful across all the industries.

Aspects herein are direct toward:
a network interface to a network;
a microprocessor; and
wherein the microprocessor performs:
accessing a communication between a customer communication device, utilized by a customer, and an automated agent, wherein the communication comprises text;
determining a purpose of the communication;
selecting, for presentation within the communication, a number of reply messages previously determined to resolve the purpose of the communication and having a presentation emotion, wherein the presentation emotion is initially a default emotion;
determining a target emotion for the communication;
upon determining the default emotion has a difference from the target emotion, selecting at least one alternate message, from a pool of alternate messages, to insert into the communication to modify the presentation emotion and attenuate the difference from the target emotion; and
present the communication, comprising the modification to the presentation emotion, to the customer communication device.

Any of the above aspects, wherein the processor performs selecting the at least one alternate message from a machine learned model of a pool of prior communications wherein the presentation emotion was modified from the default emotion with at least one alternate message selected from the pool of alternate messages.

Any of the above aspects, wherein the processor performs inserting the alternate message and further removes at least one of the number of reply messages.

Any of the above aspects, wherein the processor performs inserting the alternate message comprising altering the text of at least one of the number of reply messages.

Any of the above aspects, wherein the target emotion is determined from the subject matter of the purpose.

Any of the above aspects, wherein the target emotion is determined from a cultural background of the customer.

Any of the above aspects, wherein the cultural background of the customer is determined from a location of the customer.

Any of the above aspects, wherein the target emotion is determined from an analysis of the text portion provided by the customer.

Any of the above aspects, wherein the emotion is determined from one or more of a known personality trait of the customer.

Any of the above aspects, wherein the processor further performs, determining that the difference between the default emotion and the target emotion is a difference greater than the attenuation, connecting the communication to a communication device associated with an agent and prompting the agent to provide a portion of the communication.

A method, comprising:
accessing a communication between a customer communication device, utilized by a customer, and an automated agent, wherein the communication comprises text;
determining a purpose of the communication;
selecting, for presentation within the communication, a number of reply messages previously determined to resolve the purpose of the communication and having a presentation emotion, wherein the presentation emotion is initially a default emotion;
determining a target emotion for the communication;
upon determining the default emotion has a difference from the target emotion, selecting at least one alternate message, from a pool of alternate messages, to insert into the communication to modify the presentation emotion and attenuate the difference from the target emotion; and present the communication, comprising the modification to the presentation emotion, to the customer communication device.

Any of the above aspects, wherein selecting the at least one alternate message from a machine learned model of a pool of prior communications wherein the presentation emotion was modified from the default emotion with at least one alternate message selected from the pool of alternate messages.

Any of the above aspects, wherein inserting the alternate message and further comprises removing at least one of the number of reply messages.

Any of the above aspects, wherein the inserting the alternate message comprising altering the text of at least one of the number of reply messages.

Any of the above aspects, wherein the target emotion is determined from the subject matter of the purpose.

Any of the above aspects, wherein the target emotion is determined from a cultural background of the customer.

Any of the above aspects, wherein the cultural background of the customer is determined from a location of the customer.

Any of the above aspects, wherein the target emotion is determined from an analysis of the text portion provided by the customer.

A system, comprising:

means to accesses a communication between a customer communication device, utilized by a customer, and an automated agent, wherein the communication comprises text;

means to determine a purpose of the communication;

means to select, for presentation within the communication, a number of reply messages previously determined to resolve the purpose of the communication and having a presentation emotion, wherein the presentation emotion is initially a default emotion;

means to determine a target emotion for the communication;

means to, upon determining the default emotion has a difference from the target emotion, selecting at least one alternate message, from a pool of alternate messages, to insert into the communication to modify the presentation emotion and attenuate the difference from the target emotion; and means to present the communication, comprising the modification to the presentation emotion, to the customer communication device.

Any of the above aspects, wherein the means to select the at least one alternate message comprises means to select the at least one alternate message from a machine learned model of a pool of prior communications wherein the presentation emotion was modified from the default emotion with at least one alternate message selected from the pool of alternate messages.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 3 depicts message nodes forming resolution paths in accordance with embodiments of the present disclosure;

FIG. 4 depicts a first data structure in accordance with embodiments of the present disclosure;

FIG. 5 depicts a second data structure in accordance with embodiments of the present disclosure;

FIG. 6 depicts a third data structure in accordance with embodiments of the present disclosure;

FIG. 7 depicts a fourth data structure in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
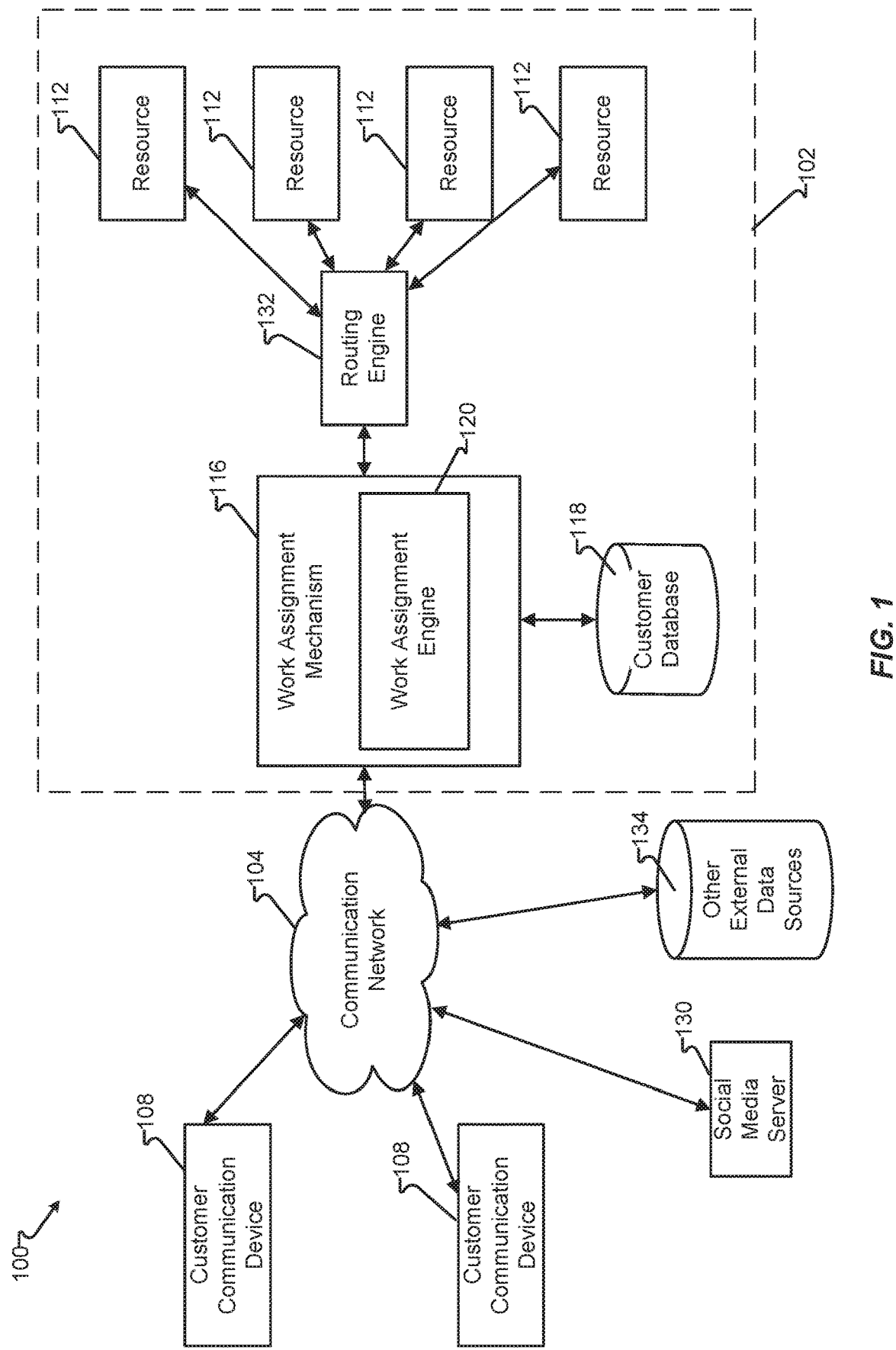
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
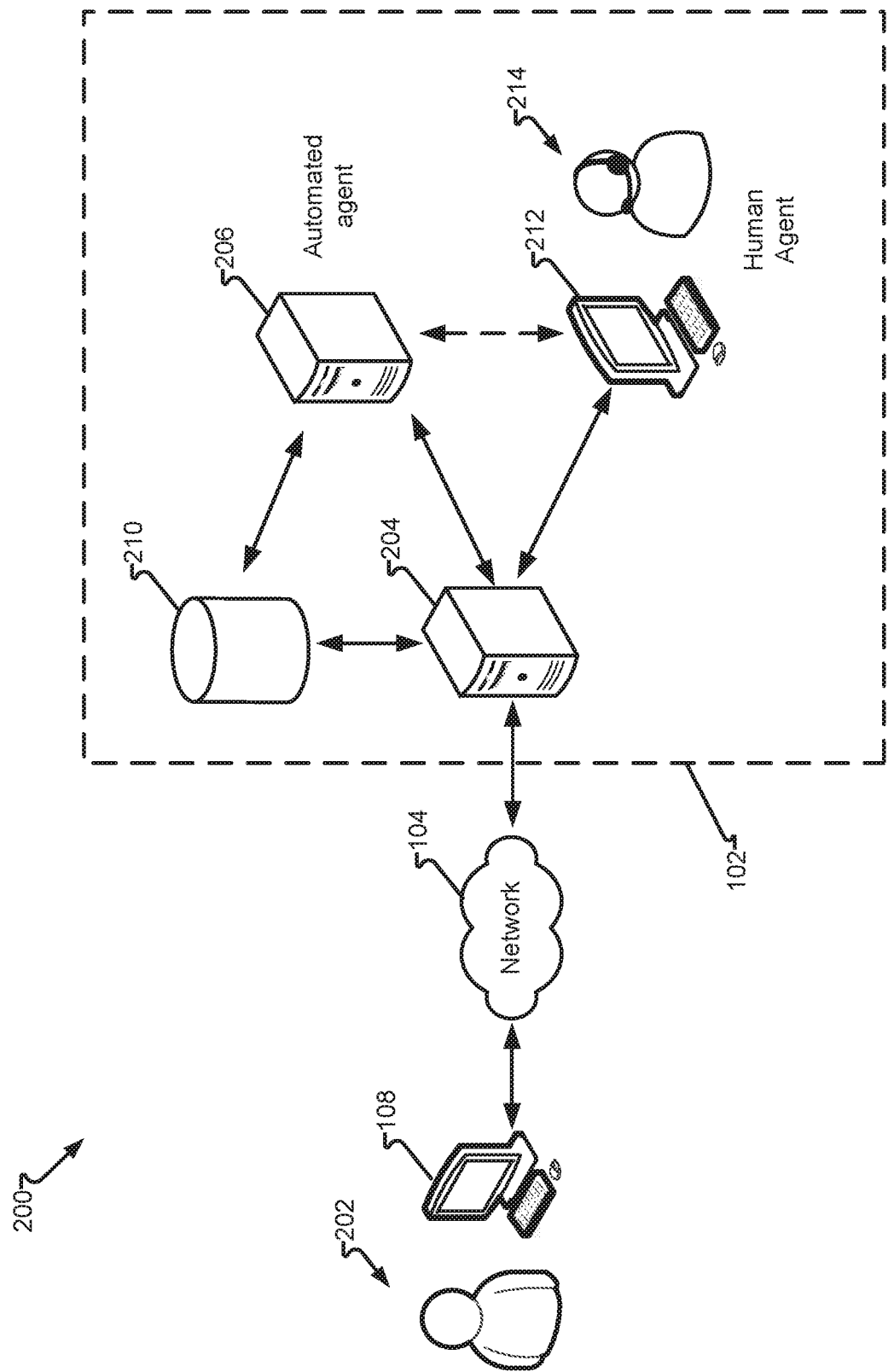
FIG. 2 depicts a second system in accordance with embodiments of the present disclosure.

FIG. 2 depicts system 200 in accordance with embodiments of the present disclosure. In one embodiment, system 200 generally comprises portions of system 100 and modifications to system 100, as will be described herein. Customer 202 utilizes customer communication device 108 to communicate, via a textual communication media (e.g., SMS, email, chat, etc.), via network 104 to communicate with contact center 102. Server 204 receives the initial contact and routes the communication to an appropriate resource, that is, one of resource 112. Automated agent 206 is one of resource 112 when embodied as an automated resource, such as at least one processor receiving communications and providing replies. Automated agent 206 may comprise or access data storage 210, such as to access logic and/or data files. Server 204 may also access data storage 210, such as to obtain routing data, perform lookups to identify an appropriate resource 112, including one of automated agent 206 and/or agent communication device 212/agent 214. Accordingly, in one embodiment, server 204 may be or comprise work assignment mechanism 116, work assignment engine 120, and/or routing engine 132. In another embodiment, server 204 may comprise a switch, router, ports, and/or other message routing components (e.g., software and circuitry).

A communication from customer 202 may be initially routed to automated agent 206. A determination as to the purpose of the communication may be determined by server 204. Additionally or alternatively, the determination of the purpose may be provided by automated agent 206. As used herein, a "purpose" is a reason for a communication, as expressed in the text of at least one text message, wherein the communication, comprising a number of text messages is address to contact center 102 (or an entity on behalf of which contact center 102 is providing services), and resolvable upon an action of contact center 102. The action may require the contact center 102 to, at least, perform one or more of accessing and/or updating information maintained in data storage 210, customer database 118, or other data storage device and provide a response based on the accessed information to customer 202 (e.g., when a product will ship, the balance on an account, provide information on a product or service, resolve a technical issue, schedule a service call, reschedule a flight, provide hours of operation, etc.) and/or obtain information from customer 202 (e.g., pay a bill, order a product or service, schedule a service call, update an address, initiate a transaction, etc.) and updating a data structure accordingly. Communications, wherein a reason for the communication cannot be ascertained from the content of the messages (e.g., the words, phrases, symbols, characters, etc. that are provided by or to customer 202) or the reason for the communication is in error (e.g., wrong company), as used herein, are absent a purpose. For example, testing communications component wherein the reason is to determine if a message can be sent and/or received, is absent a purpose as the content of the text of the message is irrelevant in order to send and/or receive a message and thereby determine whether the communications components are operational. Furthermore, it should be appreciated by one of ordinary skill in the art, that communication utilized for social communication, such as to establish or maintain an interpersonal relationship between the communicating parties, do not require a resolution comprising an action by contact center 102 and, therefore, are absent a purpose, as the term is defined herein.

In another embodiment, customer 202, via customer communication device 108, initiates a communication, comprising a number of text messages, with contact center 102, server 204 routes the communication to automated agent 206 to determine a purpose, if not already determined by server 204, perform any data processing requirements to obtain and/or save information, and formulate a reply message back to customer 202. As will be discussed more completely with respect to the embodiments that follow, a reply may be a default reply, such as messages selected without regard to a problem, severity, cultural norm, or other situational awareness and thereby having a presentation emotion associated with a default emotion. Rather, the default emotion is limited to succinct messages to get and provide information to conclude the purpose of the communication and having a neutral emotional content. Such messages may omit salutations or include generic salutations and closings. When the presentation emotion is a default emotion, such messages are likely to be considered sterile, impersonal, uncaring, or otherwise indifferent to the plight of customer 202 and the purpose of the communication. However, when customer 202 is unknown and/or when the emotional association of the problem is unknown or indeterminate, default emotional replies may be appropriate. An example of an unknown or indeterminate emotional content may include a message that has not presented sufficient or specific content (e.g., "I have a question.") or a customer 202 making the statement, "My account has a $200 credit." Until the customer elaborates or until automated agent 206 determines the underlying problem, such as asking why an account balance is apparently wrong or stating that the account should have a $500 credit and the customer is unhappy or should have been a $10 credit and the customer is happy.

In another embodiment, the messages provided by automated agent 206 to customer communication device 108 may be altered (e.g., messages modified, added and/or deleted) so that the presentation emotion is no longer the default emotion but rather attenuates any difference between a target emotion and the presentation emotion. The target emotion is a desired emotional tone associated with the purpose of the communication, other content of the communication, and/or an attribute of customer 202. For example, customer 202 may be trying to book a holiday trip for their family and have a light-hearted happy tone or inquiring as to when internet service will be restored, and a have a frustrating or angry tone. A presentation tone may be selected that is similar, such as happy and light-hearted when the purpose is also happy and light-hearted, or complementary, such as reserved and respectful when the purpose is associated with negative tones, such as anger. Similarly, customer 202 may have a preference, determined expressly or via accessing a cultural-indicating attribute of customer 202. For example, if customer 202 is American, they will generally prefer low-context messages and instead prefer to "get down to business." However, if customer 202 is Chinese, they may generally prefer to include more information, such as background or superfluous information in order to be more comfortable conducting the communication.

Accordingly, automated agent 206 may access data structures, such as those described below, from data storage 210 and match attributes associated with a determined purpose and/or customer attribute and, based thereon, modify one or more messages designed to determine and/or resolve the problem, and having a presentation emotion that is a default emotion, to have a modified presentation emotion that attenuates the difference between the default emotion and a target emotion, determined to be appropriate for the particular purpose and/or customer 202.

In another embodiment, a target emotion may not be determined and/or may not be associated with a particular message(s) having the ability to provide a sufficient target emotion. For example, customer 202 may be exceptionally upset and data storage 210 is absent any message or combination of messages that provide a resolution to the problem with the a sufficiently close presentation emotion to the determined target emotion. Accordingly, automated agent 206 may cause agent communication device 212 to be joined to the communication, such as by directly signaling agent communication device 212 and/or signaling server 204 to connect agent communication device 212 to the communication. Automated agent 206 may be kept as a node in the communication, such as providing background information and/or proposed responses to agent communication device 212 for as-is or, as modified by agent 214, inclusion in messages sent to customer communication device 108. If it is determined that the communication may continue to resolve the purpose, now within the specified range of emotions maintained in data storage 210, the communication may drop agent communication device 212 and continue with automated agent 206 and customer communication device 108 only. In another embodiment, agent communication device 212 may signal automated agent 206 to resume the communication and have automated agent 206 directly or via server 204 reconfiguration of the network topology, connect automated agent 206 to customer communication device 108.

FIG. 3 depicts message nodes 300 in accordance with embodiments of the present disclosure. In one embodiment, a communication from customer 202 has a purpose that has been determined to be resolve via nodes 300. Nodes 300, comprising nodes 302, 304A-C, 306A-B, 308, 310A-B, and 312 represent messages which may be maintained, at least in part, in data storage 210 and/or other storage device. Each of nodes 300 comprises a particular emotional score. The score may be on a single scale (e.g., positive to negative) or with regard to one or more emotion types (e.g., happy +1, concern +3, anger −3, etc.).

In one embodiment, nodes 302, 304A, 306A, 308, 310A, and 312 illustrate a path for a default emotion. That is, when automated agent 206 presents the aforementioned nodes, the presentation emotion of the messages is a default emotion, such as a neutral emotion. One or more messages may have peer messages, messages that provide the same factual content but differ on the emotional content. For example, node 302 may be an initial greeting, gather customer information (e.g., name, account number, etc.) and, if not already known, the purpose of the communication. Next, a processor, such as one of automated agent 206 determines a target emotional content, for example, "concern" as customer 202 is angry and/or the propose of the communication is to resolve a problem. Nodes 304A-C may each provide the same factual content, such as a query to ask the state of a particular device or other information, but differ in their emotional content. For example, node 304 may be neutral (e.g., "What lights are lit on the router?"), node 304B may by mildly empathetic (e.g., "I'm sorry to hear that. What lights on the router are on?"), and node 304C may be more empathetic and, optionally, comprise more than one message (e.g., "I'm so sorry. That's not right and I'll get you back up and running shortly." <send>"To get started, please tell me which lights are lit on your router."<send>).

In another embodiment, a path through nodes 300 may exclude certain nodes. For example, node 306A may be more neutral with regard to a particular emotion and appropriate for neutral and emotions (e.g., coming from nodes 304A or 304B), but may be too different when coming from node 304C, such as when node 304C expresses a high level of empathy and node 306A provides none, but node 306B provides a better transition message. Some messages, such as node 308 may be common to all or a plurality of paths and nodes 310, which provides nodes 310A and 310B which may differ on the same or different emotion. For example, node 310A may provide no remorse (e.g., "You are now up and running.") and node 310B may provide a different level of remorse (e.g., "I'm so sorry you had to go through that. You are now up and running."). Node 312 may conclude the communication or provide other ending message. If more than one issue is to be addressed, node 312 may transition to a different node path to resolve the other purpose associated with the other issue. Each path through nodes 300 may have a different emotional score, as discussed more completely with respect to FIG. 4.

FIG. 4 depicts data structure 400 in accordance with embodiments of the present disclosure. In one embodiment, data structure 400 illustrates all the possible paths through nodes 300 (see FIG. 3) in record 402A-402F. Each path having concern field 406, context field 408, and empathy field 410. It should be appreciated that the emotional attribute may be more than, less than, or different from those illustrated herein without departing from the scope of the embodiments.

In one embodiment, a particular target emotional score is desired, such as a concern score of "6." Accordingly, automated agent 206 may select record 402D, and therefrom the elements of nodes 300, specifically A-B2-C1-D-E2-F (nodes 302, 304B, 306A, 308, 310B, and 312 of FIG. 3). "Context" may not be generally considered an emotion, however, as used herein, spending additional messages and/or message content to include additional information not necessary to resolve the purpose of the communication, is designed to instill friendliness, respect, concern, interest, etc. and promote good with customer 202 in a manner similar to that expected when a proper emotion is determined and provided. Accordingly, and in one embodiment, context may be considered as an equivalent to an emotion and, therefore, an emotion.

FIG. 5 depicts data structure 500 in accordance with embodiments of the present disclosure. In one embodiment, data structure 500 comprises node records 502, message field 504, and emotional attribute fields, such as concern field 506, context field 508, and empathy field 510. Node records 502 identify a particular action, such as information to receive, provide, or an action to take. Message field 504 identify one or more message that satisfy the particular node record but with different emotional weighting, as identified by the scoring provided in one or more of concern field 506, context field 508, and empathy field 510.

Customer may be known, or customer's cultural identity known. Accordingly, a customer's preference may be accessed as customer field 512 and the proper message from message field 504 selected accordingly.

Additionally or alternatively, emoticons may be utilized to supplement or replace text to cause the message, comprising the selected emoticon, to have the desired emotional attribute.

In one embodiment, when a particular emotional weight is desired, automated agent 206 may select a particular message field 504, within node record 502, having the matching (or sufficiently close) emotional score. The message, selected from the particular message field 504, is then presented to customer communication device 108 for viewing by customer 202.

FIG. 6 depicts data structure 600 in accordance with embodiments of the present disclosure. A target emotion for a communication may be selected to facilitate understanding, communication, and goodwill with customer 202. To determine what the target emotion should be, data structure 600 may be accessed by automated agent 206. In one embodiment, data structure 600 comprises culture records 602A-D having emotional scores denied in concern field 604, context field 608, and empathy field 610. More, fewer, or different fields may be implemented without departing from the scope of the embodiments.

If customer 202 is known to contact center 102, then the specific preferences may be used and determined. However, it may be that customer 202 is entirely or partially unknown to contact center 102 except for certain information. For example, customer 202 may be a member of "Culture 3" matching record 602C and therefore have a preference for communications that have a concern level of "8", context of "3", and empathy of "6", as provided by the fields for concern field 604, context field 608, and empathy field 610, respectively.

In one embodiment, culture may be determined by geography of residence for customer 202. This may be a current residence or past residence, if known. Other aspects of customer 202 may be utilized to determine, within a previously determined margin of error, a culture based on other factors which may include, but are not limited to, native language, other languages spoken, family name, history of purchases, areas visited, cultural identity of a spouse, parent, sibling, or other family member, etc. When specific information is known about customer 202 it may overwrite or supplement category information determined from data structure 600.

FIG. 7 depicts data structure 700 in accordance with embodiments of the present disclosure. As introduced above, data structure 700 may maintain specific information regarding one or more identified customer 202. Data structure 700 comprises records 700 comprising indicia of individual customer 202. One or more emotional fields may be provided, for example, concern field 704, context field 708, empathy field 710, and culture field 712. It should be appreciated that more, fewer, or different fields may be utilized without departing from the scope of the embodiments.

Figure 8:
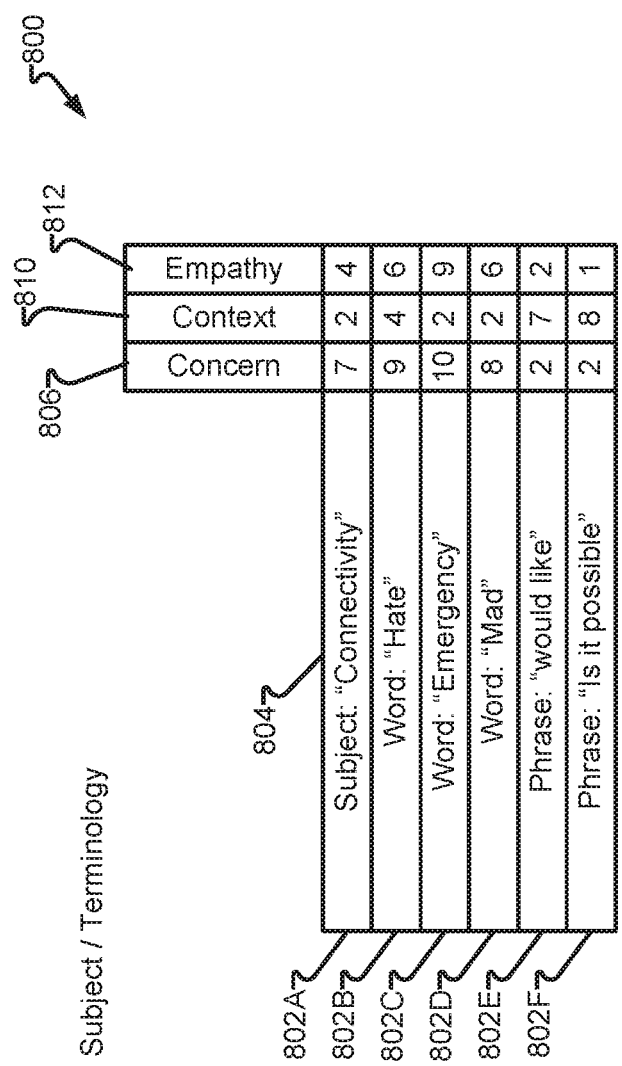
FIG. 8 depicts a fifth data structure in accordance with embodiments of the present disclosure.

FIG. 8 depicts data structure 800 in accordance with embodiments of the present disclosure. While attributes of customer 202 or an associated culture of customer 202 may be utilized to determine a target emotion, the purpose of the communication may also provide target emotional content for the messages provided to address the purpose. In one embodiment, data structure 800 comprises records 802 having communication attribute 804, concern field 806, context field 810, and empathy field 812. It should be appreciated that more, fewer, or different fields may be utilized without departing from the scope of the embodiments.

In one embodiment, communication attribute 804 comprises topics, words, phrases, or other attributes within the communication provided by customer 202 and their associated emotional scoring in concern field 806, context field 810, and empathy field 812. For example, if a communication comprised a particular word (e.g., "hate") as determined to match communication attribute field 804 for record 802B, then the communication provided by automated agent 206 should have a concern value of "9", as identified by associated concern field 806.

Data structures 400, 500, 600, 700, and 800 may be maintained in data storage 210 for access by automated agent 206. Automated agent 206 may also customize messages, such as by inserting specific information into one or more messages to further customize the scoring for any one or more emotional attributes. When automated agent 206 determines a target emotion, information from two or more data structures 600, 700, 800, and/or other sources may be combined, such as by providing a weighting to one or more values and/or defaulting to one source, such as with another source has a null value.

With the target emotion known, a purpose may be addressed while providing the emotional content to facilitate communication, understanding, and good will appropriate for a particular customer 202.

Additionally or alternatively, a machine learning model uses prior communication sessions between prior customers (prior iterations of customer 202) with contact center 102 to identify an initial record or value of a field for any record of any one or more records of data structures 400, 500, 600, 700, and/or 800. The machine learning model may be or may include any software that can automatically be used to identify which communications are successful, or at least received positive feedback from the prior customers, or failure, or at least received negative feedback from the prior customers, and the emotional content of the agent provided communications and attributes of the customer provided communications, the customer, or a particular cultural association for the customer. The machine learning model may be or may include any learning algorithm(s), such as, a linear regression algorithm, a logistic regression algorithm, a decision tree algorithm, a Naïve Bayes algorithm, a K-means algorithm, and/or the like.

Figure 9:
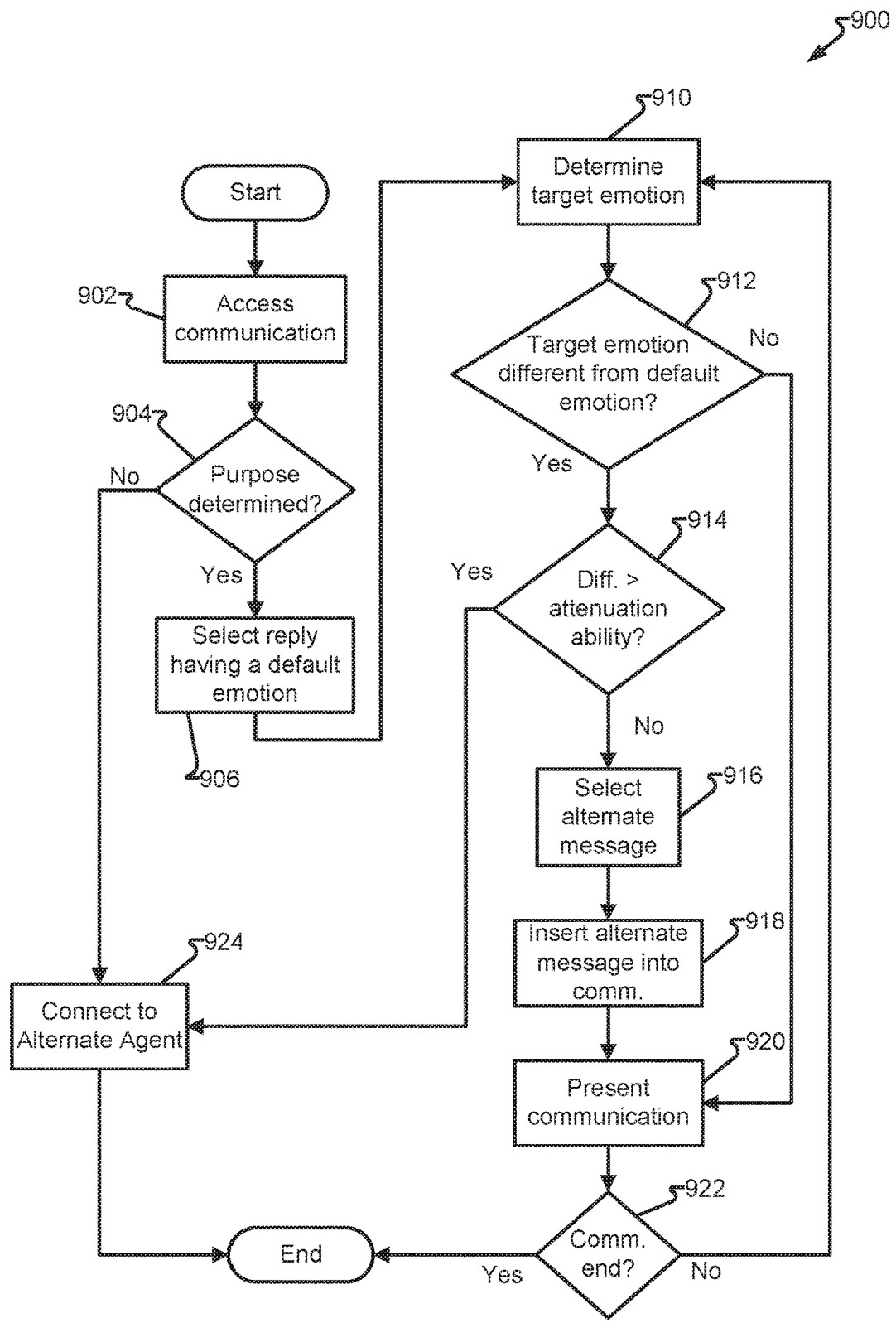
FIG. 9 depicts a process in accordance with embodiments of the present disclosure.

FIG. 9 depicts process 900 in accordance with embodiments of the present disclosure. Process 900 may be executed by a processor executing customer 202, server 204, and/or other computing device comprising hardware, such as processing and memory components, network and/or other communications connectivity, and a memory, data storage, or other non-transitory storage device configured with instructions for the operation of the processor to perform the steps described herein. Accordingly, process 900 may be embodied as machine-readable and machine-executable code for execution by a processor to perform the steps herein and, optionally, other processing tasks.

In one embodiment, process 900 begins with step 902 accessing a communication. The communication may be provided by a routing component (e.g., routing engine 132, server 204, etc.) as a first text message of a communication from customer communication device 108 operated by customer 202. In another embodiment, server 204 and/or automated agent 206 may initiate the communication, such as in response to a "text me back" request from customer communication device 108.

Test 904 determines a purpose of the communication. If successful, processing continues to step 906, otherwise processing continues to step 924 wherein the network topology is reconfigured to include agent communication device 212 and receive input therefrom, such as to determine the purpose and return processing (not shown) back to process 900 or to conduct the communication and thereby end process 900. Step 906 may select a reply message or messages to resolve the purpose of the communication and having a default emotion.

Next, in step 910 a determination of a target emotion is made, based on the communication content (e.g., word, phrase, subject matter, etc.), an attribute of customer 202, or a particular category of customer 202. Test 912 determines if the target emotion differs, or differs by a previously determine margin, from the default emotion. If test 912 is determined in the negative, processing may continue directly to step 920. However, if test 912 is determined in the affirmative, then test 914 may optionally be included to determine if the difference is beyond the attenuation ability of the messages and/or automated agent 206. For example, if a default emotional content has a particular weight or value, such as "empathy score of 13", but the messages available to resolve the purpose of the communication can only provide an empathy score of 9" then test 914 may be determined in the affirmative and processing continues to step 924, wherein agent communication device 212 is included into the communication.

If test 914 is determined in the negative, step 916 then selects an alternate message from the default for insertion into the message in step 918 and the modified messages is presented to customer 202 in step 920. Test 922 determines if the communication has ended and, if determined in the affirmative, process 900 ends. If test 922 is determined in the negative, process 900 may loop back to step 910, such as to continue to monitor the communication and re-evaluate the target emotion, such as by receiving a subsequent message from customer 202 having a different emotional score (see, FIG. 8). In a subsequent iteration of test 912, test 912 may use the current emotion, as presented in the prior execution of step 920, as the default emotion and evaluate the target emotion therewith. Processing may then continue until such time as test 922 is determined in the affirmative.

Figure 10:
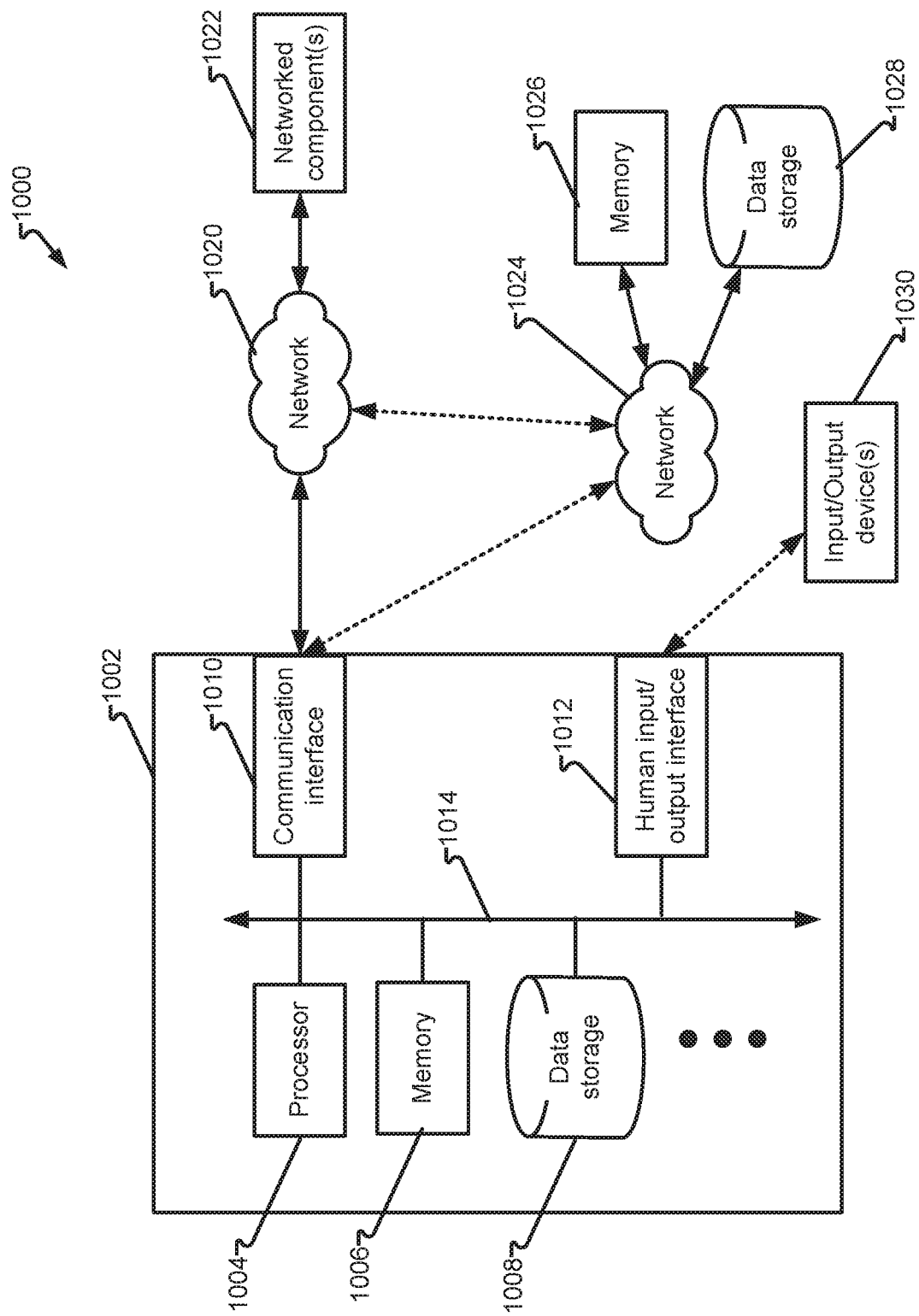
FIG. 10 depicts a third system in accordance with embodiments of the present disclosure.

FIG. 10 depicts system 1000 in accordance with embodiments of the present disclosure. In one embodiment, FIG. 10 depicts device 1002 in system 1000 in accordance with embodiments of the present disclosure. In one embodiment, automated agent 206 may be embodied, in whole or in part, as device 1002 comprising various components and connections to other components and/or systems. The components are variously embodied and may comprise processor 1004, which may then execute machine-readable instructions to perform the operations of automated agent 206, server 204, and optionally agent communication device 212. Processor 1004 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 1014, executes instructions, and outputs data, again such as via bus 1014. In other embodiments, processor 1004 may comprise a shared processing device that may be utilized by other processes and/or process owners, such as in a processing array or distributed processing system (e.g., "cloud", farm, etc.). It should be appreciated that processor 1004 is a non-transitory computing device (e.g., electronic machine comprising circuitry and connections to communicate with other components and devices). Processor 1004 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 1004) and the hardware and other circuitry thereof.

In addition to the components of processor 1004, device 1002 may utilize memory 1006 and/or data storage 1008 for the storage of accessible data, such as instructions, values, etc. such as to be an embodiment of data storage 210 and/or customer database 118. Communication interface 1010 facilitates communication with components, such as processor 1004 via bus 1014 with components not accessible via bus 1014. Communication interface 1010 may be embodied as a network port, card, cable, or other configured hardware device. Additionally or alternatively, human input/output interface 1012 connects to one or more interface components to receive and/or present information (e.g., instructions, data, values, etc.) to and/or from a human and/or electronic device. Examples of input/output devices 1030 that may be connected to input/output interface include, but are not limited to, keyboard, mouse, trackball, printers, displays, sensor, switch, relay, etc. In another embodiment, communication interface 1010 may comprise, or be comprised by, human input/output interface 1012. Communication interface 1010 may be configured to communicate directly with a networked component or utilize one or more networks, such as network 1020 and/or network 1024.

Network 104 may be embodied, in whole or in part, as network 1020. Network 1020 may be a wired network (e.g., Ethernet), wireless (e.g., WiFi, Bluetooth, cellular, etc.) network, or combination thereof and enable device 1002 to communicate with network component(s) 1022. In other embodiments, network 1020 may be embodied, in whole or in part, as a telephony network (e.g., public switched telephone network (PSTN), private branch exchange (PBX), cellular telephony network, etc.)

Additionally or alternatively, one or more other networks may be utilized. For example, network 1024 may represent a second network, which may facilitate communication with components utilized by device 1002. For example, network 1024 may be an internal network to a business entity or other organization, such as contact center 102, whereby components are trusted (or at least more so) that networked components 1022, which may be connected to network 1020 comprising a public network (e.g., Internet) that may not be as trusted.

Components attached to network 1024 may include memory 1026, data storage 1028, input/output device(s) 1030, and/or other components that may be accessible to processor 1004. For example, memory 1026 and/or data storage 1028 may supplement or supplant memory 1006 and/or data storage 1008 entirely or for a particular task or purpose. For example, memory 1026 and/or data storage 1028 may be an external data repository (e.g., server farm, array, "cloud," etc.) and allow device 1002, and/or other devices, to access data thereon. Similarly, input/output device(s) 1030 may be accessed by processor 1004 via human input/output interface 1012 and/or via communication interface 1010 either directly, via network 1024, via network 1020 alone (not shown), or via networks 1024 and 1020. Each of memory 1006, data storage 1008, memory 1026, data storage 1028 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 1030 may be a router, switch, port, or other communication component such that a particular output of processor 1004 enables (or disables) input/output device 1030, which may be associated with network 1020 and/or network 1024, to allow (or disallow) communications between two or more nodes on network 1020 and/or network 1024. For example, a connection between one particular customer, using a particular customer communication device 108, may be enabled (or disabled) with a particular networked component 1022 and/or particular resource 112, such as automated agent 206 and/or agent communication device 212 operated by agent 214. Similarly, one particular networked component 1022 and/or resource 112 may be enabled (or disabled) from communicating with a particular other networked component 1022 and/or resource 112, including, in certain embodiments, device 1002 or vice versa. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention. A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a network interface to a network;
a microprocessor; and
wherein the microprocessor performs:
    accessing a communication between a customer communication device, utilized by a customer, and an automated agent, wherein the communication comprises text;
    determining a purpose of the communication;
    selecting, for presentation within the communication, a number of reply messages previously determined to resolve the purpose of the communication and having a presentation emotion, wherein the presentation emotion is initially a default emotion;
    determining a target emotion for the communication to present to the customer;
    upon determining the default emotion has a difference from the target emotion, selecting at least one alternate message, from a pool of alternate messages, to insert into the communication to modify the presentation emotion and attenuate the difference from the target emotion; and
    present the communication, comprising the modification to the presentation emotion, to the customer communication device for presentation to the customer.

2. The system of claim 1 wherein the microprocessor performs selecting the at least one alternate message from a machine learned model of a pool of prior communications wherein the presentation emotion was modified from the default emotion with at least one alternate message selected from the pool of alternate messages.

3. The system of claim 1 wherein the microprocessor performs inserting the alternate message and further removes at least one of the number of reply messages.

4. The system of claim 1 wherein the microprocessor performs inserting the alternate message comprising altering the text of at least one of the number of reply messages.

5. The system of claim 1, wherein the target emotion is determined from a subject matter of the purpose.

6. The system of claim 1, wherein the target emotion is determined from a cultural background of the customer.

7. The system of claim 6, wherein the cultural background of the customer is determined from a location of the customer.

8. The system of claim 1, wherein the target emotion is determined from an analysis of the text portion provided by the customer.

9. The system of claim 1, wherein the target emotion is determined from one or more of a known personality trait of the customer.

10. The system of claim 1, wherein the microprocessor further performs, determining that the difference between the default emotion and the target emotion is a difference greater than the attenuation, connecting the communication to a communication device associated with an agent and prompting the agent to provide a portion of the communication.

11. A method, comprising:
    accessing a communication between a customer communication device, utilized by a customer, and an automated agent, wherein the communication comprises text;
    determining a purpose of the communication;
    selecting, for presentation within the communication, a number of reply messages previously determined to resolve the purpose of the communication and having a presentation emotion, wherein the presentation emotion is initially a default emotion;
    determining a target emotion for the communication to present to the customer;
    upon determining the default emotion has a difference from the target emotion, selecting at least one alternate message, from a pool of alternate messages, to insert into the communication to modify the presentation emotion and attenuate the difference from the target emotion; and
    present the communication, comprising the modification to the presentation emotion, to the customer communication device for presentation to the customer.

12. The method of claim 11, wherein selecting the at least one alternate message from a machine learned model of a pool of prior communications wherein the presentation emotion was modified from the default emotion with at least one alternate message selected from the pool of alternate messages.

13. The method of claim 11 wherein inserting the alternate message and further comprises removing at least one of the number of reply messages.

14. The method of claim 11 wherein the inserting the alternate message comprising altering the text of at least one of the number of reply messages.

15. The method of claim 11, wherein the target emotion is determined from a subject matter of the purpose.

16. The method of claim 11, wherein the target emotion is determined from a cultural background of the customer.

17. The method of claim 16, wherein the cultural background of the customer is determined from a location of the customer.

18. The method of claim 11, wherein the target emotion is determined from an analysis of the text portion provided by the customer.

19. A system, comprising:
    means to accesses a communication between a customer communication device, utilized by a customer, and an automated agent, wherein the communication comprises text;
    means to determine a purpose of the communication;
    means to select, for presentation within the communication, a number of reply messages previously determined to resolve the purpose of the communication and having a presentation emotion, wherein the presentation emotion is initially a default emotion;
    means to determine a target emotion for the communication to present to the customer;
    means to, upon determining the default emotion has a difference from the target emotion, selecting at least one alternate message, from a pool of alternate messages, to insert into the communication to modify the presentation emotion and attenuate the difference from the target emotion; and
    means to present the communication, comprising the modification to the presentation emotion, to the customer communication device for presentation to the customer.

20. The system of claim 19 wherein the means to select the at least one alternate message comprises means to select the at least one alternate message from a machine learned model of a pool of prior communications wherein the presentation emotion was modified from the default emotion with at least one alternate message selected from the pool of alternate messages.

* * * * *